(12) United States Patent
Wang et al.

(10) Patent No.: US 12,422,198 B2
(45) Date of Patent: Sep. 23, 2025

(54) HEAT DISSIPATION FIN CONSTRUCTION METHOD, RELATED APPARATUS, AND HEAT DISSIPATION FIN

(71) Applicant: ZHEJIANG YINLUN MACHINERY CO., LTD., Zhejiang (CN)

(72) Inventors: Yanxi Wang, Zhejiang (CN); Yongjia Xiong, Zhejiang (CN); Jinqiu Xu, Zhejiang (CN); Linjie Xu, Zhejiang (CN); Huan Xu, Zhejiang (CN)

(73) Assignee: ZHEJIANG YINLUN MACHINERY CO., LTD., Zhejiang (CN)

( * ) Notice: Subject to any disclaimer, the term of this patent is extended or adjusted under 35 U.S.C. 154(b) by 167 days.

(21) Appl. No.: 18/254,330

(22) PCT Filed: Feb. 25, 2021

(86) PCT No.: PCT/CN2021/077764
§ 371 (c)(1),
(2) Date: May 24, 2023

(87) PCT Pub. No.: WO2022/110561
PCT Pub. Date: Jun. 2, 2022

(65) Prior Publication Data
US 2024/0118041 A1 Apr. 11, 2024

(30) Foreign Application Priority Data
Nov. 24, 2020 (CN) .......................... 202011334716.7

(51) Int. Cl.
*F28F 3/02* (2006.01)
*G06F 30/20* (2020.01)

(52) U.S. Cl.
CPC .............. *F28F 3/025* (2013.01); *G06F 30/20* (2020.01); *F28F 2215/04* (2013.01); *F28F 2255/00* (2013.01)

(58) Field of Classification Search
CPC .... F28F 3/025; F28F 2215/04; F28F 2255/00; G06F 30/20
(Continued)

(56) References Cited

U.S. PATENT DOCUMENTS

| 2,035,665 A | * | 3/1936 | Palmer | F28D 1/0316 |
| | | | | 165/DIG. 380 |
| 2,252,211 A | * | 8/1941 | Seemiller | F28F 1/126 |
| | | | | 165/151 |

(Continued)

FOREIGN PATENT DOCUMENTS

| CN | 102997741 A | 3/2013 |
| CN | 202947523 U | 5/2013 |

(Continued)

OTHER PUBLICATIONS

International Search Report for International Patent Application No. PCT/CN2021/077764 issued by the Chinese Patent Office on May 24, 2021.

(Continued)

*Primary Examiner* — Claire E Rojohn, III
(74) *Attorney, Agent, or Firm* — IP & T GROUP LLP

(57) ABSTRACT

Provided are a heat dissipation fin construction method, a related apparatus, and a heat dissipation fin. The heat dissipation fin construction method comprises: setting a plurality of structural parameter sets according to the preset numerical ranges of the twill angle, the wave amplitude, and the wavelength of a heat dissipation fin; separately obtaining respective heat transfer coefficients and air side pressure drops of the structural parameter sets, and establishing a fitting relationship between the heat transfer coefficients and the air side pressure drops for structural parameters; generating a corresponding performance map and a corresponding contour map on the basis of performance data of the fitted structural parameter sets; and determining an optimization (Continued)

interval of the wave amplitude and the wavelength of the heat dissipation fin according to the contour map, and constructing the heat dissipation fin according to the optimization interval.

6 Claims, 11 Drawing Sheets

(58) Field of Classification Search
USPC .................................................. 165/104.11
See application file for complete search history.

(56) References Cited

U.S. PATENT DOCUMENTS

| | | | | |
|---|---|---|---|---|
| 2,329,789 | A * | 9/1943 | Schank | B21D 53/04 428/595 |
| 2,782,009 | A * | 2/1957 | Rippingille | F28D 9/0062 165/DIG. 387 |
| 3,151,675 | A * | 10/1964 | Lysholm | F28F 3/04 165/166 |
| 3,262,495 | A * | 7/1966 | Baird | F28D 1/0316 165/DIG. 447 |
| 4,189,330 | A * | 2/1980 | Strindehag | C23C 22/66 148/272 |
| 4,200,441 | A * | 4/1980 | Honmann | F24F 3/1423 165/10 |
| 4,420,039 | A * | 12/1983 | Dubrovsky | F28F 3/027 165/166 |
| 4,729,428 | A * | 3/1988 | Yasutake | F28F 13/12 165/166 |
| 4,903,762 | A * | 2/1990 | Marsais | F28F 9/002 165/149 |
| 5,372,187 | A * | 12/1994 | Haushalter | F28F 13/12 165/152 |
| 5,560,424 | A * | 10/1996 | Ogawa | B21D 13/045 165/181 |
| 5,623,989 | A * | 4/1997 | Kroger | F28F 3/046 165/181 |
| 5,625,229 | A * | 4/1997 | Kojima | H01L 23/3672 257/722 |
| 5,636,685 | A * | 6/1997 | Gawve | F28D 1/0316 165/166 |
| 6,435,268 | B1 * | 8/2002 | Bhatti | F28F 17/005 165/111 |
| 6,729,388 | B2 * | 5/2004 | Emrich | F28D 1/05366 165/181 |
| 7,040,386 | B2 * | 5/2006 | Shimoya | F28F 1/32 165/153 |
| 7,159,649 | B2 * | 1/2007 | Thyrum | F28F 9/001 165/DIG. 399 |
| 7,367,386 | B2 * | 5/2008 | Sato | F01M 5/002 165/175 |
| 7,445,040 | B2 * | 11/2008 | Szulman | F28F 3/027 165/110 |
| 8,424,592 | B2 * | 4/2013 | Meshenky | B21D 13/08 165/181 |
| 8,516,699 | B2 * | 8/2013 | Grippe | F28F 13/08 29/890.03 |
| 8,590,606 | B2 * | 11/2013 | Arai | F28D 9/0062 165/166 |
| 8,844,504 | B2 * | 9/2014 | Raduenz | F28F 9/0265 165/157 |
| 9,080,819 | B2 * | 7/2015 | Nakano | F28F 1/126 |
| 9,651,315 | B2 * | 5/2017 | Cui | F28F 13/125 |
| 9,689,620 | B2 * | 6/2017 | Yamada | F28F 13/02 |
| 9,816,762 | B2 * | 11/2017 | Sugimoto | F28D 1/0333 |
| 9,835,387 | B2 * | 12/2017 | Berta | F28F 17/005 |
| 9,945,619 | B2 * | 4/2018 | Cho | F28F 3/025 |
| 9,950,133 | B2 * | 4/2018 | Umehara | A61M 16/1075 |
| 10,197,336 | B2 * | 2/2019 | Iwasaki | F28F 3/027 |
| 10,202,880 | B2 * | 2/2019 | Kuroyanagi | F28D 9/0031 |
| 10,302,372 | B2 * | 5/2019 | Minami | B21D 53/04 |
| 10,422,588 | B2 * | 9/2019 | Smith | F28F 3/027 |
| 11,306,979 | B2 * | 4/2022 | Yun | F28F 1/422 |
| D964,046 | S * | 9/2022 | Bottlang | B32B 5/12 D5/56 |
| 11,454,448 | B2 * | 9/2022 | Fukada | F28F 3/027 |
| 2002/0007935 | A1 * | 1/2002 | Marsala | F25B 39/022 257/E23.098 |
| 2003/0118781 | A1 * | 6/2003 | Insley | B01D 39/163 156/199 |
| 2004/0050538 | A1 * | 3/2004 | Sunder | F25J 5/002 165/DIG. 360 |
| 2004/0177668 | A1 * | 9/2004 | Sagasser | F28D 9/005 72/326 |
| 2004/0177949 | A1 * | 9/2004 | Shimoya | F28F 1/32 165/177 |
| 2005/0161206 | A1 * | 7/2005 | Ambros | F28F 9/0219 165/173 |
| 2006/0289152 | A1 * | 12/2006 | Leuschner | F28F 3/02 165/152 |
| 2007/0012430 | A1 * | 1/2007 | Duke | F28F 1/128 165/109.1 |
| 2007/0056721 | A1 * | 3/2007 | Usui | F28D 7/1684 165/183 |
| 2007/0227715 | A1 * | 10/2007 | Shimoya | F28D 1/05366 165/177 |
| 2008/0264098 | A1 * | 10/2008 | Shikazono | F28F 1/32 165/171 |
| 2009/0025916 | A1 * | 1/2009 | Meshenky | F28D 1/05358 165/165 |
| 2009/0194265 | A1 * | 8/2009 | Nakamura | F28F 9/026 165/149 |
| 2010/0025024 | A1 * | 2/2010 | Meshenky | F02M 26/32 165/173 |
| 2010/0071886 | A1 * | 3/2010 | Shikazono | F28F 1/32 165/151 |
| 2010/0095659 | A1 * | 4/2010 | Kuroyanagi | F02B 29/0418 60/320 |
| 2012/0205081 | A1 * | 8/2012 | Terai | F28D 9/0025 156/60 |
| 2012/0318485 | A1 * | 12/2012 | Yabe | F28F 3/025 165/185 |
| 2020/0166293 | A1 * | 5/2020 | Turney | F28F 7/02 |
| 2024/0118041 | A1 * | 4/2024 | Wang | G06F 30/20 |

FOREIGN PATENT DOCUMENTS

| | | | |
|---|---|---|---|
| CN | 103913091 A | 7/2014 | |
| CN | 106716041 A | 5/2017 | |
| CN | 107024132 A | 8/2017 | |
| CN | 107390525 A | 11/2017 | |
| CN | 111199113 A | 5/2020 | |
| CN | 211236908 U | 8/2020 | |
| CN | 112414199 A * | 2/2021 | F28F 3/025 |
| JP | 7-167578 A | 7/1995 | |
| JP | H07167578 A | 7/1995 | |

OTHER PUBLICATIONS

Written Opinion for International Patent Application No. PCT/CN2021/077764 issued by the Chinese Patent Office on May 19, 2021.
First Office Action for Chinese Patent Application No. 202011334716.7 issued on by the Chinese Patent Office.
Notification to Grant Patent Right for Invention of Priory for Chinese Patent Application No. 202011334716.7 issued by the Chinese Patent Office.
Notice of Granting Priority Right of Utility Model Patent for Chinese Patent Application No. CN 202011334716.7 issued by the Chinese Patent Office on Oct. 20, 2021.
Office Action for Chinese Patent Application No. CN 202011334716.7 issued by the Chinese Patent Office on Jun. 22, 2021.

(56) References Cited

OTHER PUBLICATIONS

International Search Report and Written Opinion on International Patent Application No. PCT/CN2021/077764 issued by the International Searching Authority on May 24, 2021.

* cited by examiner

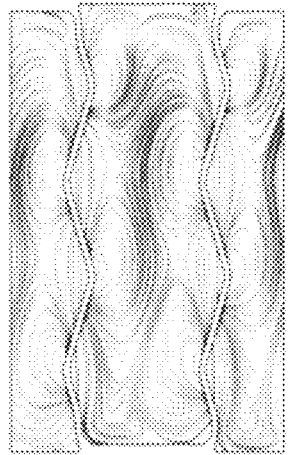 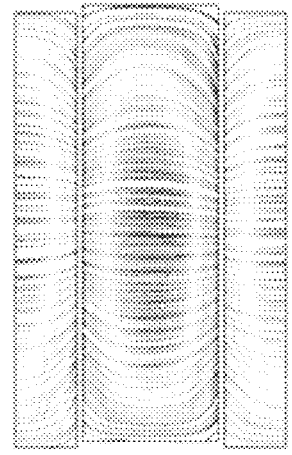
FIG. 6A  FIG. 6B
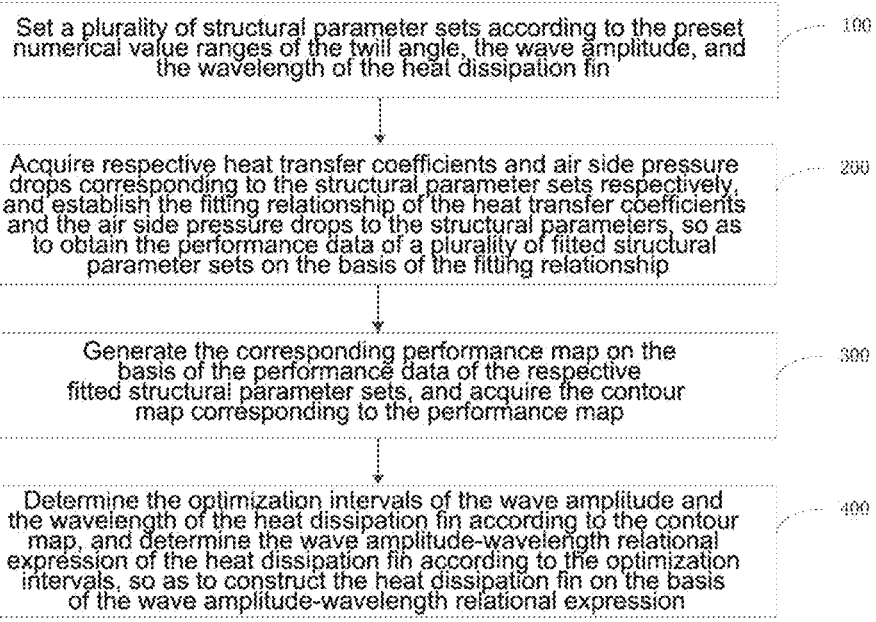
FIG. 7

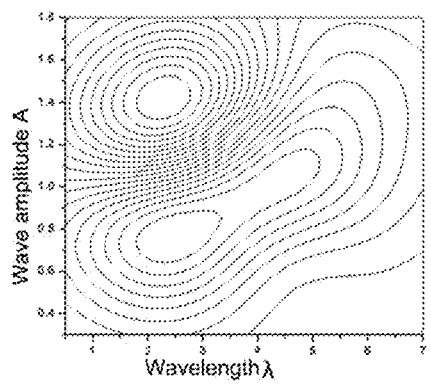
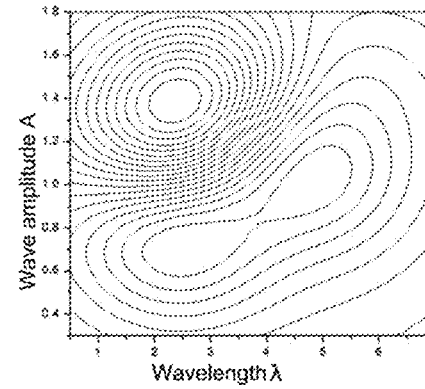
FIG. 13A  FIG. 13B
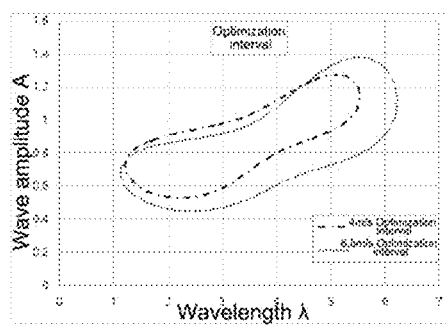
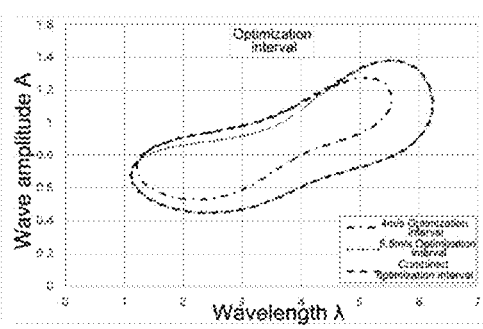
FIG. 14A  FIG. 14B
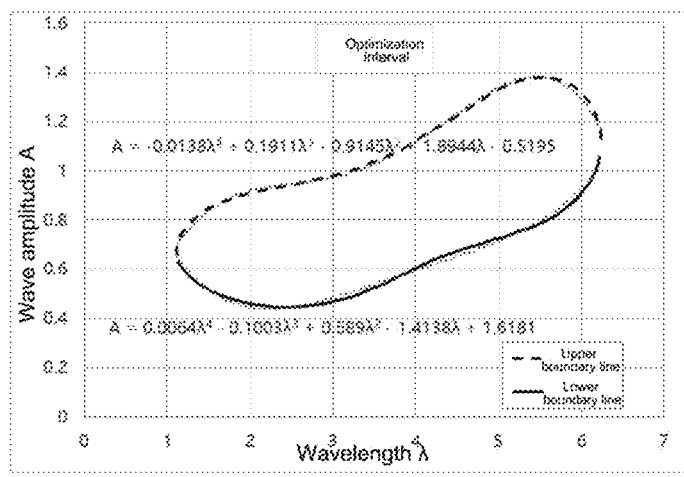
FIG. 15

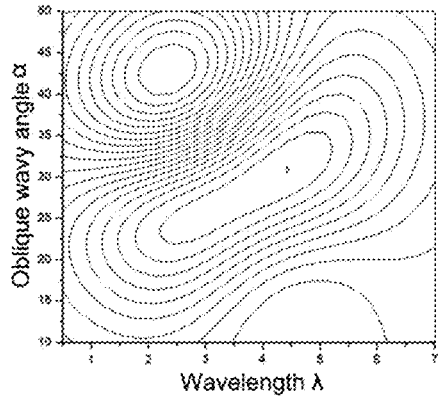 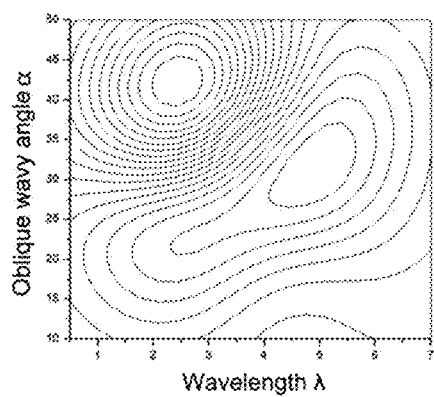
FIG. 16A  FIG. 16B
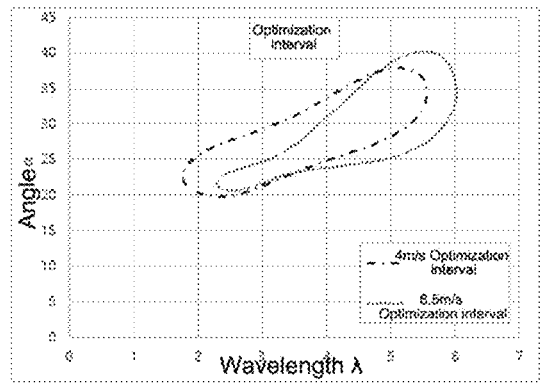
FIG. 17
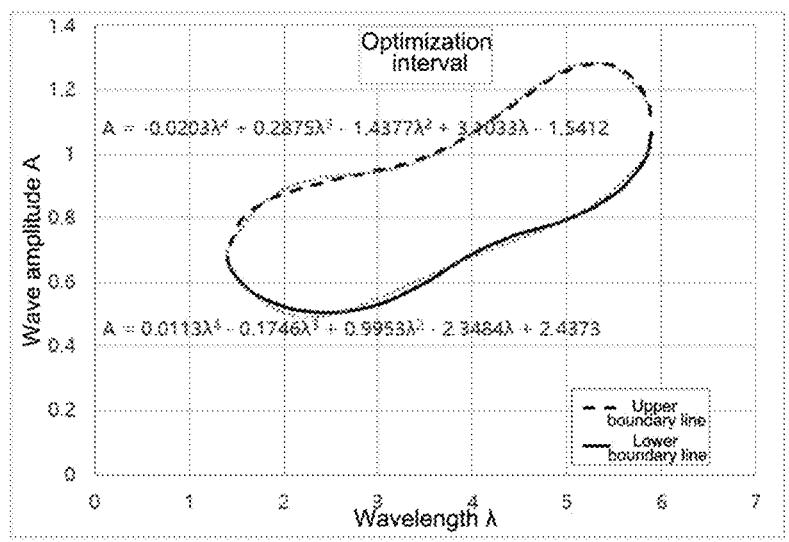
FIG. 18

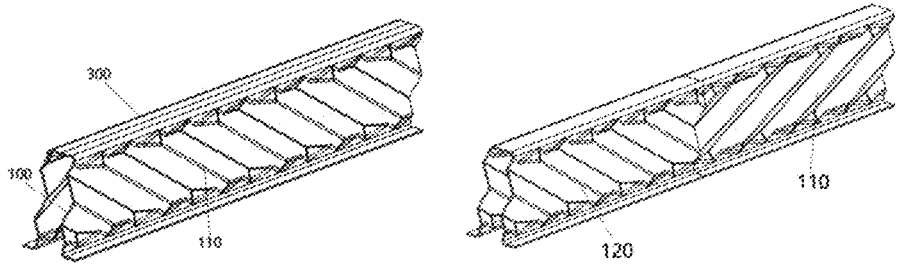
FIG. 19                    FIG. 20
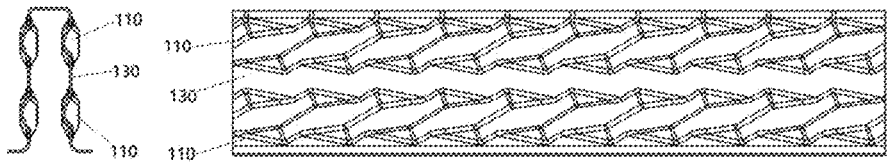
FIG. 21A                    FIG. 21B
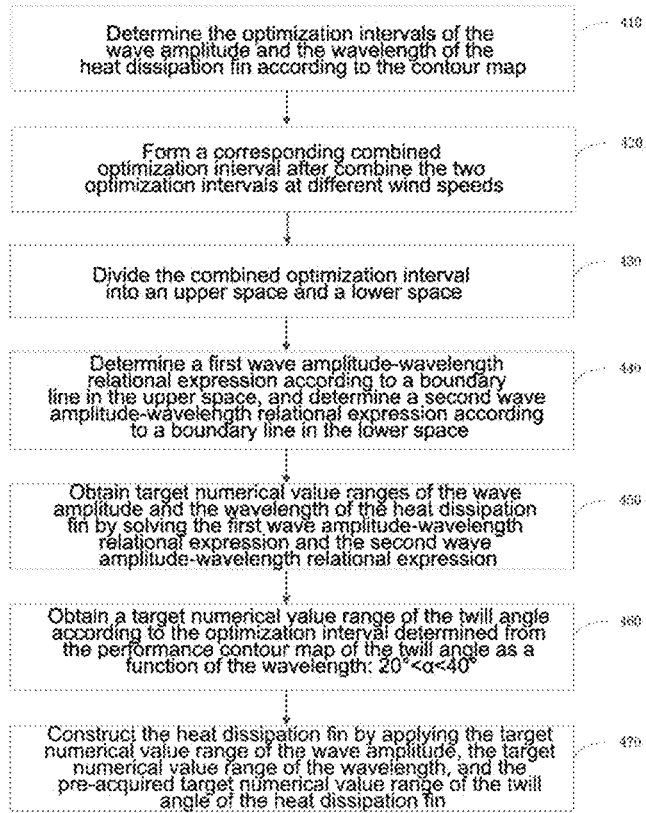
FIG. 22

HEAT DISSIPATION FIN CONSTRUCTION METHOD, RELATED APPARATUS, AND HEAT DISSIPATION FIN

CROSS REFERENCE TO RELATED APPLICATION

The present disclosure is a national stage application of PCT/CN2021/077764 filed on Feb. 25, 2021, which claims the priority to the Chinese patent application with the filing No. 202011334716.7 filed on Nov. 24, 2020 with the Chinese Patent Office and entitled "Heat Dissipation Fin Construction Method, Related Device, and Heat Dissipation Fin", the contents of which are incorporated herein by reference in entirety.

TECHNICAL FIELD

The present disclosure relates to the technical field of heat dissipation devices, and specifically to a heat dissipation fin construction method and related apparatus, and a heat dissipation fin.

BACKGROUND ART

At present, in order to meet heat dissipation requirements and also be capable of avoiding a problem that the heat dissipation fin is prone to blockage when a working environment is relatively poor, a heat dissipation fin is provided, while in a process of constructing the heat dissipation fin, how to obtain an optimization parameter range thereof is a key issue for designing the heat dissipation fin.

The patent document with publication number CN106716041B discloses that ridges and furrows with an angle of inclination of 10°~60° are arranged alternately on various wall surfaces of corrugated heat dissipation fins, and when a height of the ridges and furrows is set to Wh, an interval of the ridges and furrows is set to Wp, an interval of the corrugated heat dissipation fins is set to Pf, and a plate thickness of the heat dissipation fins is set to Tf, the following conditions are satisfied:

$$Wh \leq 0.3674 Wp + 1.893 Tf - 0.1584;$$

$$0.088 < (Wh - Tf)/Pf < 0.342;$$

$$aWp^2 + bWp + c < Wh, \text{ where}$$

$$a = 0.004 Pf^2 - 0.0696 Pf + 0.3642;$$

$$b = -0.0036 Pf^2 + 0.0625 Pf - 0.5752;$$

$$c = 0.0007 Pf^2 + 0.1041 Pf + 0.2333.$$

Although the above mode makes corresponding researches on the heat dissipation fin, complete key factors are not considered in the researches thereof. Therefore, there is an urgent need to more fully study various parameters of the heat dissipation fin, to find more reasonable optimization method and interval to construct a heat dissipation fin with better performances.

SUMMARY

The present disclosure provides a heat dissipation fin construction method and related apparatus, and a heat dissipation fin, which solves the problem of how to find more reasonable optimization intervals to construct a heat dissipation fin with better performances.

Embodiments of the present disclosure adopt following technical solutions:

an embodiment of the present disclosure provides a heat dissipation fin construction method, wherein the method includes steps of:

setting a plurality of structural parameter sets according to preset numerical value ranges of a twill angle, a wave amplitude, and a wavelength of a heat dissipation fin;

acquiring respective heat transfer coefficients and air side pressure drops corresponding to the respective structural parameter sets respectively, and establishing fitting relationships of the heat transfer coefficients and the air side pressure drops versus the structural parameters, so as to obtain performance data of a plurality of fitted structural parameter sets on the basis of the fitting relationships;

generating a corresponding performance map on the basis of the performance data of the respective fitted structural parameter sets, and acquiring a contour map corresponding to the performance map; and determining optimization intervals of the wave amplitude and the wavelength of the heat dissipation fin according to the contour map, and determining a wave amplitude-wavelength relational expression of the heat dissipation fin according to the optimization intervals, so as to construct the heat dissipation fin on the basis of the wave amplitude-wavelength relational expression.

Optionally, the step of generating a corresponding performance map on the basis of the performance data of the respective fitted structural parameter sets and acquiring a contour map corresponding to the performance map includes steps of:

generating a corresponding performance map on the basis of the performance data of the respective fitted structural parameter sets, wherein various points in the performance map respectively represent the performance data of the respective fitted structural parameter sets in one-to-one correspondence, and the performance data include the heat transfer coefficient and the air side pressure drop;

providing an upper boundary line in the performance map, wherein the upper boundary line is for representing optimal heat transfer coefficients corresponding to different air side pressure drops respectively;

expanding the performance map according to a distance of the upper boundary line so as to form a performance cloud chart corresponding to the respective fitted structural parameter sets; and converting the performance cloud chart into corresponding contour map according to contours.

Optionally, the step of determining optimization intervals of the wave amplitude and the wavelength of the heat dissipation fin according to the contour map and determining a wave amplitude-wavelength relational expression of the heat dissipation fin according to the optimization intervals so as to construct the heat dissipation fin on the basis of the wave amplitude-wavelength relational expression includes steps of:

determining the optimization intervals of the wave amplitude and the wavelength of the heat dissipation fin according to the contour map;

forming a corresponding combined optimization interval after combining two optimization intervals at different wind speeds, and dividing the combined optimization interval into an upper space and a lower space;

determining a first wave amplitude-wavelength relational expression according to a boundary line in the upper space, and determining a second wave amplitude-wavelength relational expression according to a boundary line in the lower space;

obtaining numerical value ranges of the wave amplitude and the wavelength of the heat dissipation fin by solving the first wave amplitude-wavelength relational expression and the second wave amplitude-wavelength relational expression;

obtaining a target numerical value range of the twill angle according to the optimization interval determined from the performance contour map of the twill angle as a function of the wavelength; and constructing the heat dissipation fin by applying the target numerical value range of the wave amplitude, the target numerical value range of the wavelength, and the pre-acquired target numerical value range of the twill angle of the heat dissipation fin.

Optionally, the step of acquiring respective heat transfer coefficients and air side pressure drops corresponding to the structural parameter sets respectively and establishing fitting relationships of the heat transfer coefficients and the air side pressure drops versus the structural parameters, so as to obtain performance data of a plurality of fitted structural parameter sets on the basis of the fitting relationships includes steps of:

setting values of a height, a thickness, and a peak-to-peak distance of a heat dissipation belt of the heat dissipation fin in a heat dissipation fin physical model, and setting calculation variables;

calculating the respective heat transfer coefficients and air side pressure drops corresponding to the structural parameter sets based on a preset CFD mode according to the values of the height, the thickness, and the peak-to-peak distance of the heat dissipation belt of the heat dissipation fin in the heat dissipation fin physical model, and the calculation variables respectively; and fitting the heat transfer coefficients and the air side pressure drops to the structural parameters respectively, wherein the structural parameters include: the wavelength, the wave amplitude, and the twill angle; and obtaining fitting relationships of the heat transfer coefficients and the air side pressure drops versus various structural parameters, so as to obtain performance data of a plurality of fitted structural parameter sets on the basis of the fitting relationships.

Optionally, before the step of setting a plurality of structural parameter sets according to preset numerical value ranges of a twill angle, a wave amplitude, and a wavelength of a heat dissipation fin, it further includes a step of:

receiving numerical value ranges of the twill angle, the wave amplitude, and the wavelength of the heat dissipation fin, wherein the numerical value range of the twill angle is 10°-80°, the numerical value range of the wave amplitude is 0.3 mm-1.8 mm, and the numerical value range of the wavelength is 1 mm-7 mm.

Optionally, the step of setting a plurality of structural parameter sets according to preset numerical value ranges of a twill angle, a wave amplitude, and a wavelength of a heat dissipation fin includes a step of:

setting a plurality of structural parameter sets according to the preset numerical value ranges of the twill angle, the wave amplitude, and the wavelength of the heat dissipation fin by applying a preset DOE mode.

An embodiment of the present disclosure further provides a heat dissipation fin construction apparatus, including:

a parameter set constructing module, configured to set a plurality of structural parameter sets according to preset numerical value ranges of a twill angle, a wave amplitude, and a wavelength of a heat dissipation fin;

a fitting module, configured to acquire respective heat transfer coefficients and air side pressure drops corresponding to the respective structural parameter sets respectively, and establish fitting relationships of the heat transfer coefficients and the air side pressure drops versus the structural parameters, so as to obtain performance data of a plurality of fitted structural parameter sets on the basis of the fitting relationships;

a contour map constructing module, configured to generate a corresponding performance map on the basis of the performance data of the respective fitted structural parameter sets, and acquire a contour map corresponding to the performance map; and a relational expression acquiring module, configured to determine optimization intervals of the wave amplitude and the wavelength of the heat dissipation fin according to the contour map, and determine a wave amplitude-wavelength relational expression of the heat dissipation fin according to the optimization intervals, so as to construct the heat dissipation fin on the basis of the wave amplitude-wavelength relational expression.

Optionally, the contour map constructing module is configured to:

generate a corresponding performance map on the basis of the performance data of the respective fitted structural parameter sets, wherein various points in the performance map respectively represent the performance data of the respective fitted structural parameter sets in one-to-one correspondence, and the performance data include the heat transfer coefficient and the air side pressure drop;

provide an upper boundary line in the performance map, wherein the upper boundary line is for representing optimal heat transfer coefficients corresponding to different air side pressure drops respectively;

expand the performance map according to a distance of the upper boundary line so as to form a performance cloud chart corresponding to the respective fitted structural parameter sets; and convert the performance cloud chart into corresponding contour map according to contours.

Optionally, the relational expression acquiring module is configured to:

determine optimization intervals of the wave amplitude and the wavelength of the heat dissipation fin according to the contour map;

form a corresponding combined optimization interval after combining two optimization intervals at different wind speeds, and divide the combined optimization interval into an upper space and a lower space;

determine a first wave amplitude-wavelength relational expression according to a boundary line in the upper space, and determine a second wave amplitude-wavelength relational expression according to a boundary line in the lower space;

obtain numerical value ranges of the wave amplitude and the wavelength of the heat dissipation fin by solving the first wave amplitude-wavelength relational expression and the second wave amplitude-wavelength relational expression;

obtain a target numerical value range of the twill angle according to the optimization interval determined from the performance contour map of the twill angle as a function of the wavelength; and construct the heat dissipation fin by applying the target numerical value range of the wave amplitude, the target numerical value range of the wavelength, and the pre-acquired target numerical value range of the twill angle of the heat dissipation fin.

Optionally, the fitting module is configured to:

set values of a height, a thickness, and a peak-to-peak distance of a heat dissipation belt of the heat dissipation fin in a heat dissipation fin physical model, and set calculation variables;

calculate the heat transfer coefficients and air side pressure drops corresponding to the respective structural parameter sets based on a preset CFD mode according to the values of the height, the thickness, and the peak-to-peak distance of the heat dissipation belt of the heat dissipation fin in the heat dissipation fin physical model, and the calculation variables respectively; and fit the heat transfer coefficients and the air side pressure drops to the structural parameters respectively, wherein the structural parameters include: the wavelength, the wave amplitude, and the twill angle; and obtain fitting relationships of the heat transfer coefficients and the air side pressure drops versus various structural parameters, so as to obtain performance data of a plurality of fitted structural parameter sets on the basis of the fitting relationships.

Optionally, the parameter set constructing module is configured to:

set a plurality of structural parameter sets according to the preset numerical value ranges of the twill angle, the wave amplitude, and the wavelength of the heat dissipation fin by applying a preset DOE mode.

An embodiment of the present disclosure further provides an electronic device, including a memory, a processor, and a computer program stored on the memory and executable on the processor, wherein the processor, when executes the program, implements the steps of the heat dissipation fin construction method.

An embodiment of the present disclosure further provides a computer-readable storage medium, on which a computer program is stored, wherein the computer program, when executed by a processor, implements the steps of the heat dissipation fin construction method.

An embodiment of the present disclosure further provides a heat dissipation fin, wherein the heat dissipation fin includes at least two corrugated sheets arranged in a first direction, two adjacent corrugated sheets are arranged opposite to each other, the corrugated sheets have a length extending in a second direction, a first corrugated portion with a central line extending in a third direction is formed on each of the corrugated sheets, a cross section of the first corrugated portion has a peak and a trough; and the first direction is perpendicular to the second direction;

the heat dissipation fin satisfies the following relational expressions:

$$20° \leq \alpha \leq 40°;$$

$$A < -0.0138\lambda^4 + 0.1911\lambda^3 - 0.9145\lambda^2 + 1.8944\lambda - 0.5195;$$
and $$A > 0.0064\lambda^4 - 0.1003\lambda^3 + 0.589\lambda^2 - 1.4138\lambda + 1.6181,$$
where $\alpha$ is an angle between the central line and the second direction;

A is the wave amplitude, i.e., a distance between the peak and the trough in the first direction; and $\lambda$ is the wavelength, i.e., a distance between two adjacent peaks in a fourth direction, wherein the fourth direction is perpendicular to the first direction and the third direction.

The heat dissipation fin is constructed by applying a heat dissipation fin construction method, and wherein the heat dissipation fin construction method includes steps of:

setting a plurality of structural parameter sets according to preset numerical value ranges of a twill angle, the wave amplitude, and the wavelength of the heat dissipation fin;

acquiring respective heat transfer coefficients and air side pressure drops corresponding to the structural parameter sets respectively, and establishing fitting relationships of the heat transfer coefficients and the air side pressure drops versus the structural parameters, so as to obtain performance data of a plurality of fitted structural parameter sets on the basis of the fitting relationships;

generating a corresponding performance map on the basis of the performance data of the respective fitted structural parameter sets, and acquiring a contour map corresponding to the performance map; and determining optimization intervals of the wave amplitude and the wavelength of the heat dissipation fin according to the contour map, and determining a wave amplitude-wavelength relational expression of the heat dissipation fin according to the optimization intervals, so as to construct the heat dissipation fin on the basis of the wave amplitude-wavelength relational expression.

The relational expression of the heat dissipation fin structure can preferably select the following ranges:

$$25° \leq \alpha \leq 35°;$$

$$A < -0.0203\lambda^4 + 0.2875\lambda^3 - 1.4377\lambda^2 + 3.1033\lambda - 1.5412;$$
and $$A > 0.0113\lambda^4 - 0.1746\lambda^3 + 0.9953\lambda^2 - 2.3484\lambda + 2.4373.$$

Optionally, the central line of one corrugated sheet of the two adjacent corrugated sheets and the central line of the other corrugated sheet are non-coplanar straight lines, and acute angles formed between the central line of each of the two adjacent corrugated sheets and the second direction are both $\alpha$.

Optionally, the corrugated sheet is further provided with a second corrugated portion, and the first corrugated portion and the second corrugated portion are mirror-symmetrical with a plane perpendicular to the second direction as a plane of symmetry.

Optionally, the corrugated sheet is further formed with a flat portion, the two corrugated portions are connected to two ends of the flat portion in one-to-one correspondence in a fifth direction, the flat portion is perpendicular to the first direction, and the fifth direction is perpendicular to the first direction and the second direction.

The technical solutions provided in the present disclosure can achieve the beneficial effects including, for example:

the heat dissipation fin construction method and related apparatus and the heat dissipation fin provided in the present disclosure can provide more reasonable parameter optimization intervals of the heat dissipation fin, further can effectively improve the anti-blocking performance of the heat dissipation fin while greatly improving the heat dissipation performance of the heat dissipation fin, and can simultaneously achieve the best heat dissipation and anti-blocking performances.

BRIEF DESCRIPTION OF DRAWINGS

In order to more clearly illustrate technical solutions of embodiments of the present disclosure, drawings which need to be used in the description of the embodiments will be introduced briefly below.

FIG. 6A is a sectional streamline view of the heat dissipation fin in an embodiment of the present disclosure;

FIG. 6B is a sectional streamline view of the wavy fin in an embodiment of the present disclosure;

FIG. 7 is a flowchart of a heat dissipation fin construction method in an embodiment of the present disclosure;

FIG. 13A is a performance contour map of wave amplitude as a function of wavelength at the wind speed of 4 m/s in an embodiment of the present disclosure;

FIG. 13B is a performance contour map of wave amplitude as a function of wavelength at the wind speed of 6.5 m/s in an embodiment of the present disclosure;

FIG. 14A is a chart of corresponding optimization intervals of wave amplitude as a function of wavelength at the wind speeds of 4 m/s and 6.5 m/s in an embodiment of the present disclosure;

FIG. 14B is a chart of corresponding combined optimization interval of wave amplitude as a function of wavelength at the wind speeds of 4 m/s and 6.5 m/s in an embodiment of the present disclosure;

FIG. 15 is a chart of curves in upper and lower spaces of the optimization interval of wave amplitude as a function of wavelength in an embodiment of the present disclosure;

FIG. 16A is a corresponding performance contour map of twill angle as a function of wavelength at the wind speed of 4 m/s in an embodiment of the present disclosure;

FIG. 16B is a corresponding performance contour map of twill angle as a function of wavelength at the wind speed of 6.5 m/s in an embodiment of the present disclosure;

FIG. 17 shows corresponding parameter optimization intervals of twill angle as a function of wavelength at the wind speeds of 4 m/s and 6.5 m/s in an embodiment of the present disclosure;

FIG. 18 is a chart of curves in upper and lower spaces of a second parameter optimization interval of wave amplitude as a function of wavelength in an embodiment of the present disclosure;

FIG. 19 is a schematic diagram of a structure optimization example of an oblique wavy fin in an embodiment of the present disclosure;

FIG. 20 is a schematic diagram of another structure optimization example of the oblique wavy fin in an embodiment of the present disclosure;

FIG. 21A and FIG. 21B are schematic diagrams of another structure optimization example of the oblique wavy fin in an embodiment of the present disclosure;

FIG. 22 is a flowchart of step 400 in the heat dissipation fin construction method in an embodiment of the present disclosure.

DETAILED DESCRIPTION OF EMBODIMENTS

Figure 1:
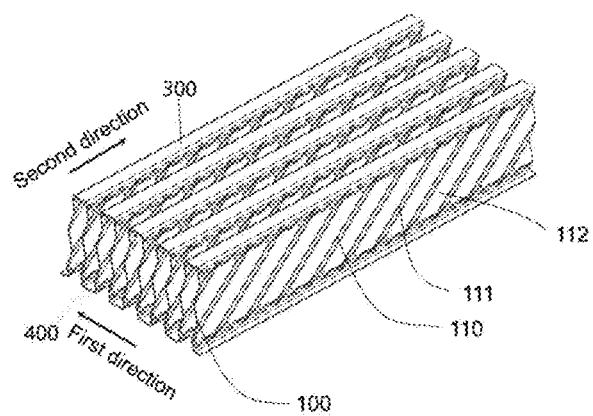
FIG. 1 is a perspective structural schematic view of a heat dissipation fin in an embodiment of the present disclosure.

Technical solutions of the present disclosure will be described clearly and completely below with reference to drawings, and apparently, the embodiments described are only some but not all embodiments of the present disclosure.

The heat dissipation fin in the present disclosure is an oblique wavy fin, and configuration principle of the heat dissipation fin is as follows:

structure of the heat dissipation fin: a flat material is bent to form many continuous Ω (Chinese character 几) shapes, which may include upper and lower surfaces and middle ribs, the middle ribs can be formed thereon with a strip-shaped structure with concave-convex arrangement, a central line of the strip-shaped structure forms an included angle α with the upper and lower surfaces, and the included angle α is less than 90°, thus forming an oblique wavy structure. When cooling air passes through the oblique wavy structure, the heat dissipation performance will be improved from the following two aspects: firstly, when cooling air passes through oblique waves, an obvious secondary flow will be formed, so that boundary layers are separated, then the heat dissipation performance can be effectively improved; secondly, the oblique waves will guide the cold air towards a root portion of the fin, and the root portion of the fin is a primary heat exchange surface with relatively high heat exchange efficiency, so that the heat dissipation performance can also be obviously improved. Moreover, the heat dissipation fin is still a continuous fin, and the anti-blocking performance thereof is comparable with that of conventional wavy fin.

Since the optimization analysis is mainly performed by means of CFD, analysis precision of the CFD is confirmed first. Three samples with different structural parameters are made with the conventional wavy fin, and tested in a wind tunnel, and measured data are analyzed, calculated, and processed to obtain a heat transfer coefficient HA and a cold side pressure drop ΔP of heat dissipation belts, models are established according to the heat dissipation belts of the three specifications, to perform CFD analysis and obtain corresponding heat transfer coefficient HA and cold side pressure drop ΔP, which are compared with the heat transfer coefficient HA and the cold side pressure drop ΔP obtained from the test. See Table 1 for results, wherein differences between the two are within acceptable ranges, therefore, it is feasible to perform optimization by the CFD analysis method.

TABLE 1

|  | Sample 1 | Sample 2 | Sample 3 |
| --- | --- | --- | --- |
| HA tested | 105.6 | 128.6 | 40.3 |
| HA by CFD analysis | 106.8 | 130.1 | 41.2 |
| HA deviation % | 1.1% | 1.2% | 2.2% |
| ΔP tested | 301.5 | 413.5 | 120.5 |
| ΔP by CFD analysis | 311.4 | 426.3 | 124.9 |
| ΔP deviation % | 3.3% | 3.1% | 3.7% |

In order to make the heat dissipation fin achieve due effects, research is conducted on key structures thereof corresponding to various different working conditions, to define an optimization parameter interval. According to structural characteristics of the heat dissipation fin, research objects of the key structures are twill angle α, wave amplitude A, and wavelength λ, and different application working conditions: low wind speed of 4 m/s and high wind speed of 6.5 m/s. Range and number of structural parameter changes that need to be analyzed for univariate research are planned, a boundary of the analysis is defined, a corresponding 3D model is further completed, and corresponding heat exchange performance indexes, the heat transfer coefficient HA and the pressure drop ΔP are obtained by means of the CFD analysis. A relationship of the heat transfer coefficient HA and the pressure drop ΔP to various parameters, i.e., the twill angle α, the wave amplitude A, and the wavelength λ is fitted by an analysis tool, wherein it is necessary to achieve a very small residual error for performing a next research. The heat transfer coefficients HA and the pressure drops ΔP under different parameter combinations are obtained by using the fitting relationships. The heat transfer coefficients HA and the pressure drops ΔP corresponding to these structures are shown on a coordinate graph, wherein an upper boundary line can be found from the graph, and the upper boundary line is corresponding to optimal HA manifestation of different parameter structures under the same ΔP. These parameters are studied to obtain a cloud map of comprehensive performance as a function of various parameters, and the cloud map is converted into contour expression, so that an optimization interval can be seen intuitively, and a suitable interval is selected to express this region with upper and lower curves.

Figure 2A:
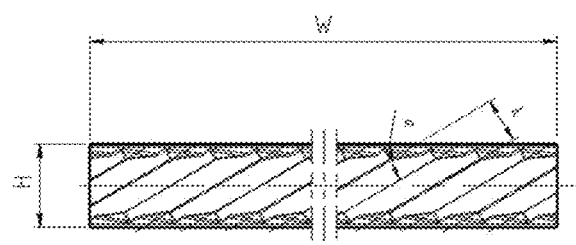
FIG. 2A is a front view of the heat dissipation fin in an embodiment of the present disclosure.
Figure 2B:
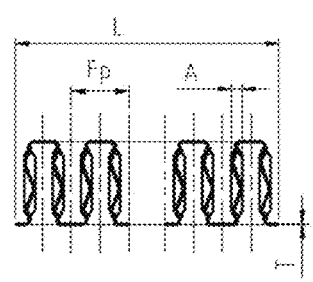
FIG. 2B is a side view of the heat dissipation fin in an embodiment of the present disclosure.
Figure 3A:
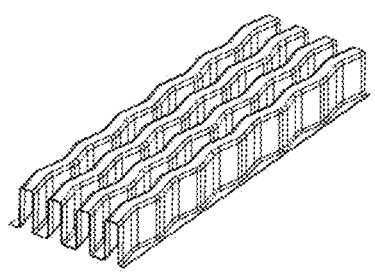
FIG. 3A is a perspective structural schematic view of a conventional wavy fin in an embodiment of the present disclosure.
Figure 3B:
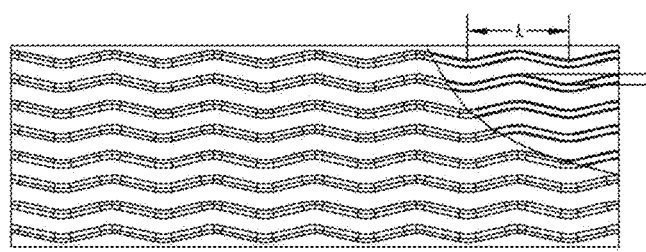
FIG. 3B is a top schematic view of the conventional wavy fin in an embodiment of the present disclosure.
Figure 3C:
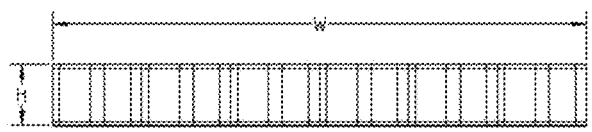
FIG. 3C is a front schematic view of the conventional wavy fin in an embodiment of the present disclosure.
Figure 3D:
FIG. 3D is a side schematic view of the conventional wavy fin in an embodiment of the present disclosure.

The heat dissipation fin as shown in FIG. 1 and FIG. 2B may include at least two corrugated sheets 100 arranged in a first direction, wherein two adjacent corrugated sheets 100 are arranged opposite to each other, the corrugated sheets 100 have a length extending in a second direction, a first corrugated portion 110 with a central line extending in a third direction is formed on each corrugated sheet 100, a cross section of the first corrugated portion 110 has a peak 111 and a trough 112; and the first direction is perpendicular to the second direction; that is to say, the heat dissipation fin in the present disclosure is formed into many continuous Ω shapes by bending the flat material, and may include the upper and lower surfaces and the middle ribs, the ribs are formed thereon with the wavy structure with a concave-convex arrangement, and the central line of the waves forms the included angle α with the upper and lower surfaces. Since the fin is shaped in an oblique wave, it is referred to as oblique wavy fin for short. Main parameters of the heat dissipation fin provided in the embodiments of the present disclosure are introduced below. In FIG. 2A and FIG. 2B, H represents a height of the heat dissipation fin, W represents a width of the heat dissipation fin, and α represents the twill angle; L represents a length of the heat dissipation fin, Fp represents a peak-to-peak distance of the heat dissipation fin, T represents a material thickness of the heat dissipation fin, λ represents a wavelength of the heat dissipation fin, and A represents a wave amplitude of the heat dissipation fin. In practical applications, the twill angle α, the wavelength λ, and the wave amplitude A are key parameters, and determine the performances of the heat dissipation fin.

Figures 4A, 4B:
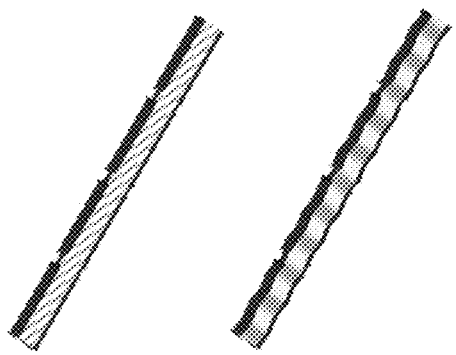
FIG. 4A is a schematic view of the heat dissipation fin in an embodiment of the present disclosure.
FIG. 4B is a schematic view of the wavy fin in an embodiment of the present disclosure.
Figures 5A, 5B:
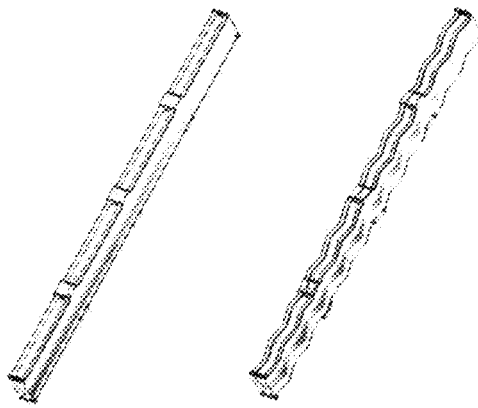
FIG. 5A is an overall streamline schematic view of the heat dissipation fin in an embodiment of the present disclosure.
FIG. 5B is an overall streamline schematic view of the wavy fin in an embodiment of the present disclosure.

By comparing models of the heat dissipation fin and the wavy fin as shown in FIG. 4A and FIG. 4B, the heat dissipation fin has improved performances compared with the relative common wavy fin, mainly embodied in two aspects: on the one hand, by comparing overall streamline diagrams of the heat dissipation fin and the wavy fin as shown in FIG. 5A and FIG. 5B, after the cold air passes through the heat dissipation fin, the cold air may be guided towards the root portion of the fin, and this region is a primary heat exchange area, with relatively high heat exchange efficiency. On the other hand, by comparing streamline diagrams of sections of the heat dissipation fin and the wavy fin as shown in FIG. 6A and FIG. 6B, when the cold air passes through the wavy fin, the streamline is neat, the cold air will move as a whole along shape of the wavy fin. However, the heat dissipation fin has much more complex streamline, since an obvious secondary flow is generated when the cold air passes through the oblique waves, which can enhance the heat exchange. Shadows in FIGS. 5A, 5B, 6A, and 6B represent an air flow rate, and a darker color in the drawings indicates a larger gas flow rate. Hence, the heat dissipation performances can be improved by 5-10% by finally selecting suitable structural parameters of the heat dissipation fin. The heat dissipation fin also needs suitable parameter structures, and key parameters of these structures are studied below.

Based on the above contents, in order to be capable of effectively improving the anti-blocking performance of the heat dissipation fin while greatly improving the heat dissipation performance of the heat dissipation fin, the present disclosure provides an embodiment of a heat dissipation fin construction method, and with reference to FIG. 7, the heat dissipation fin construction method specifically includes the following contents:

step 100: a plurality of structural parameter sets can be set according to preset numerical value ranges of a twill angle, a wave amplitude, and a wavelength of a heat dissipation fin;

In step 100, a specific embodiment mode of the structural parameter sets may be a heat dissipation fin physical model formed on the basis of structural parameters.

Optionally, optimization parameters in the structural parameter sets are not merely limited to the twill angle, the wave amplitude, and the wavelength, and may also be added or deleted according to actual situations. On the basis of the twill angle, the wave amplitude, and the wavelength, adding characteristic parameters of the heat dissipation fin or deleting the parameters should be understood as being covered within the scope of protection of the present disclosure.

Step 200: respective heat transfer coefficients and air side pressure drops corresponding to the structural parameter sets can be acquired respectively, and fitting relationships of the heat transfer coefficients and the air side pressure drops versus the structural parameters can be established, so as to obtain performance data of a plurality of fitted structural parameter sets on the basis of the fitting relationships.

In step 200, the performance data may refer to the heat transfer coefficient HA and the air side pressure drop ΔP.

Step 300: a corresponding performance map can be generated on the basis of the performance data of the respective fitted structural parameter sets, and a contour map corresponding to the performance map can be acquired.

Step 400: optimization intervals of the wave amplitude and the wavelength of the heat dissipation fin can be determined according to the contour map, and a wave amplitude-wavelength relational expression of the heat dissipation fin can be determined according to the optimization intervals, so as to construct the heat dissipation fin on the basis of the wave amplitude-wavelength relational expression.

Figure 8:
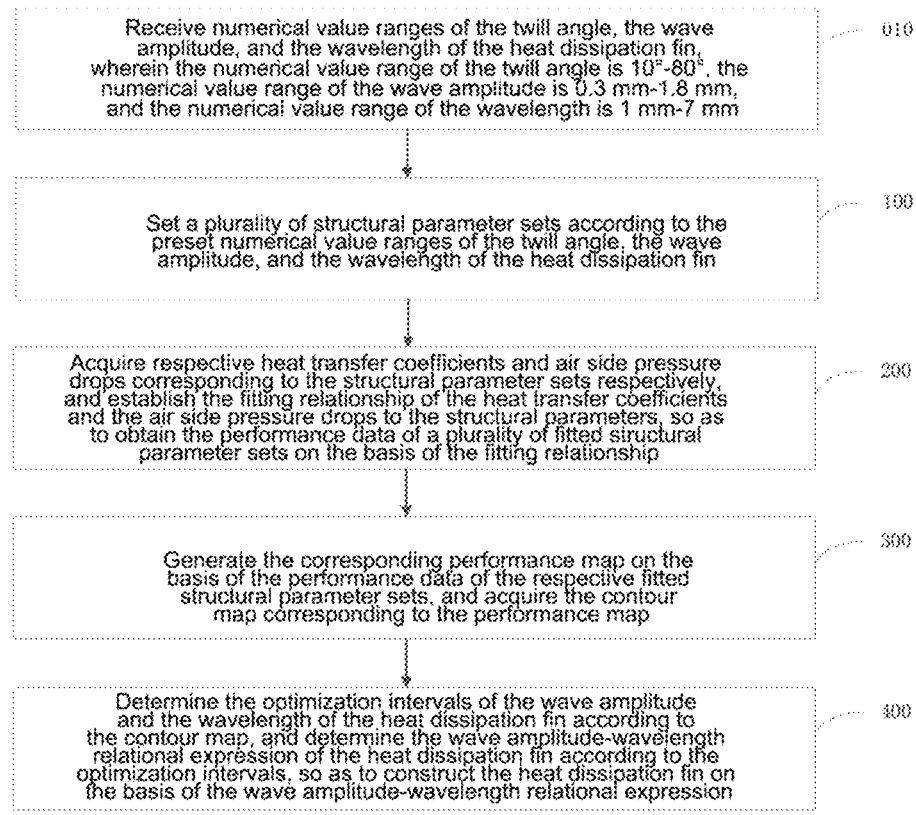
FIG. 8 is another flowchart of the heat dissipation fin construction method in an embodiment of the present disclosure.

In order to effectively improve the application reliability of a parameter table, so as to further improve the heat dissipation performance and the anti-blocking performance of the heat dissipation fin, in an embodiment of the heat dissipation fin construction method in the present disclosure, referring to FIG. 8, before step 100, the heat dissipation fin construction method further can include the following contents:

step 010: numerical value ranges of the twill angle, the wave amplitude, and the wavelength of the heat dissipation fin can be received, wherein the numerical value range of the twill angle may be 10°-80°, the numerical value range of the wave amplitude may be 0.3 mm-1.8 mm, and the numerical value range of the wavelength may be 1 mm-7 mm.

In step 010, the heat dissipation fin construction apparatus can call the preset numerical value ranges of the twill angle α, the wave amplitude A, and the wavelength λ of the heat dissipation fin in advance from an authorized database, and also can directly acquire parameters input by a user through a preset UI interface.

In a specific example of step 010, according to the structural characteristics of the heat dissipation fin, research objects of key structures are the twill angle α, the wave amplitude A, and the wavelength λ. Suitable ranges are selected: numerical value ranges of the twill angle, the wave amplitude, and the wavelength of the heat dissipation fin, as shown in Table 2.

TABLE 2

| Variable | Range |
| --- | --- |
| Angle α | 10-80° |
| Wave amplitude A | 0.3-1.8 mm |
| Wavelength λ | 1-7 mm |

On the basis of the above Table 2, in order to effectively improve the application reliability and accuracy of the heat dissipation fin physical model, so as to further improve the heat dissipation performance and the anti-blocking performance of the heat dissipation fin, in an embodiment of the heat dissipation fin of the present disclosure, step 100 of the heat dissipation fin construction method specifically includes the following contents:

step 110: a plurality of structural parameter sets can be set according to preset numerical value ranges of the twill angle, the wave amplitude, and the wavelength of the heat dissipation fin by applying a preset DOE mode.

In step 110, the optimization parameters can be set in a set change range by using a DOE (design of experiment) method, and in an example, the optimization parameters of 45 combinations can be specifically set.

Figure 9:
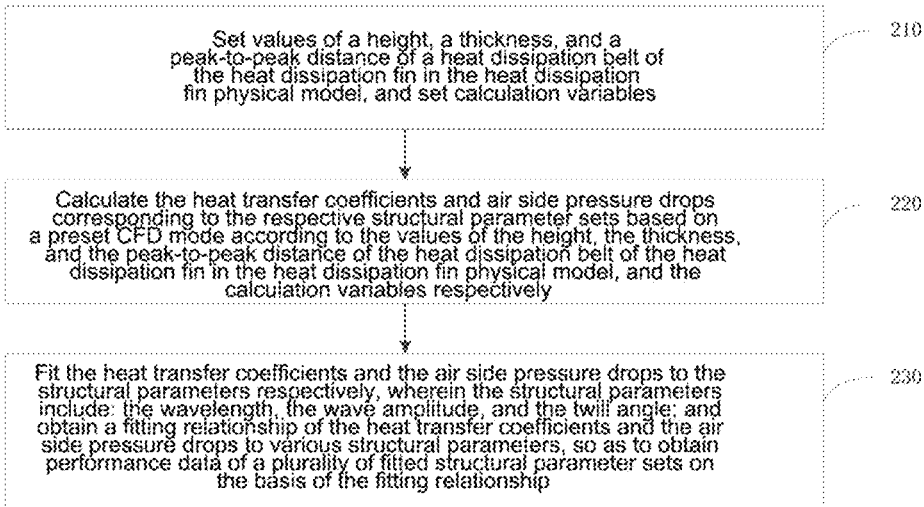
FIG. 9 is a flowchart of step 200 in the heat dissipation fin construction method in an embodiment of the present disclosure.

In order to further improve the heat dissipation performance and the anti-blocking performance of the heat dissipation fin, in an embodiment of the heat dissipation fin construction method in the present disclosure, referring to FIG. 9, step 200 of the heat dissipation fin construction method may include the following contents:

step 210: values of a height, a thickness, and a peak-to-peak distance of a heat dissipation belt of the heat dissipation fin in the heat dissipation fin physical model can be set, and calculation variables can be set.

In step 210, it can be pre-defined that the heat-dissipation belt has the height H of 7.8 mm, and the thickness T of 0.12 mm. The peak-to-peak distance Fp can be set to be typical 4 and 5.35, and a calculation boundary can be set as follows: a constant temperature on a pipe wall surface is 90° C., a cold air temperature is 30° C., and a cold air blowing rate is typically 4 and 6.5 m/s.

Step 220: respective heat transfer coefficients and air side pressure drops corresponding to the structural parameter sets can be respectively calculated based on a preset CFD mode according to the values of the height, the thickness, and the peak-to-peak distance of the heat dissipation belt of the heat dissipation fin in the heat dissipation fin physical model, and the calculation variables.

In step 220, the heat transfer coefficient HA and the air side pressure drop ΔP can be obtained through preset CFD (computational fluid dynamics) analysis.

Step 230: the heat transfer coefficient and the air side pressure drop can be fitted to the structural parameters respectively, wherein the structural parameters include: the wavelength, the wave amplitude, and the twill angle, and a fitting relationship of the heat transfer coefficients and the air side pressure drops to various structural parameters are obtained, so as to obtain performance data of a plurality of fitted structural parameter sets on the basis of the fitting relationships.

In the above, specifically, the heat transfer coefficient HA and the air side pressure drop ΔP are respectively fitted to the structural parameters such as the wavelength λ, the wave amplitude A, and the twill angle α, and more than 1000 sets of the structural parameters are listed in the present case.

In step 230, the relationship of the heat transfer coefficient HA and the air side pressure drop ΔP to various parameters can be fitted through a preset analysis tool. The fitting accuracy requires the residual error to achieve that the heat transfer coefficient HA is less than 2% and that the air side pressure drop ΔP is less than 5%.

Figure 10:
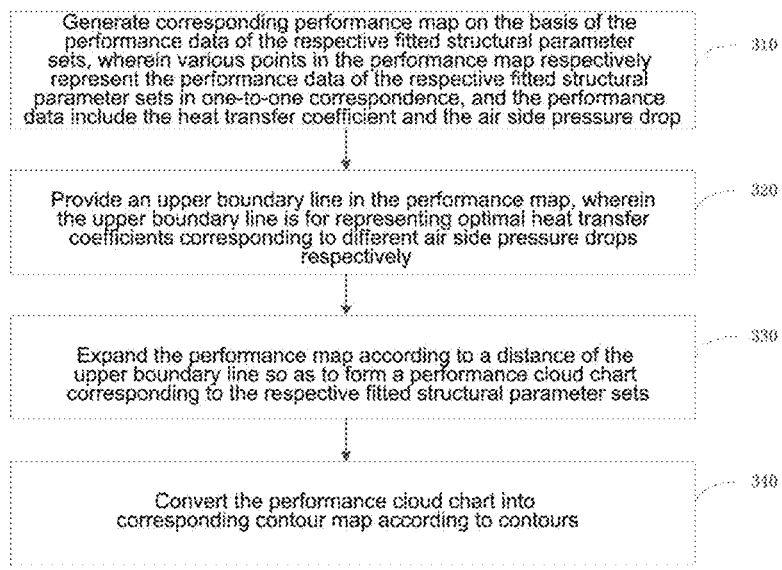
FIG. 10 is a flowchart of step 300 in the heat dissipation fin construction method in an embodiment of the present disclosure.

In order to effectively improve the accuracy and effectiveness of a parameter optimization space of the heat dissipation fin, so as to further improve the heat dissipation performance and the anti-blocking performance of the heat dissipation fin, in an embodiment of the heat dissipation fin construction method of the present disclosure, referring to FIG. 10, step 300 of the heat dissipation fin construction method specifically includes the following contents:

step 310: a corresponding performance map can be generated on the basis of the performance data of the respective fitted structural parameter sets, wherein various points in the performance map can represent the performance data of the respective fitted structural parameter sets in one-to-one correspondence, and the performance data may include the heat transfer coefficient and the air side pressure drop.

Figure 11A:
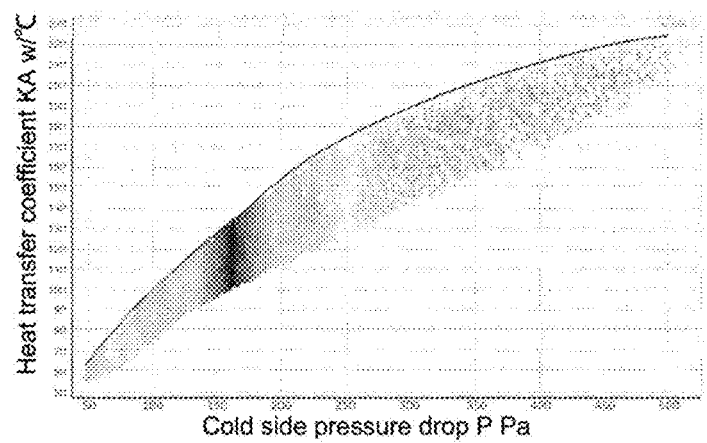
FIG. 11A is a corresponding performance map of wave amplitude as a function of wavelength at a wind speed of 4 m/s in an embodiment of the present disclosure.
Figure 11B:
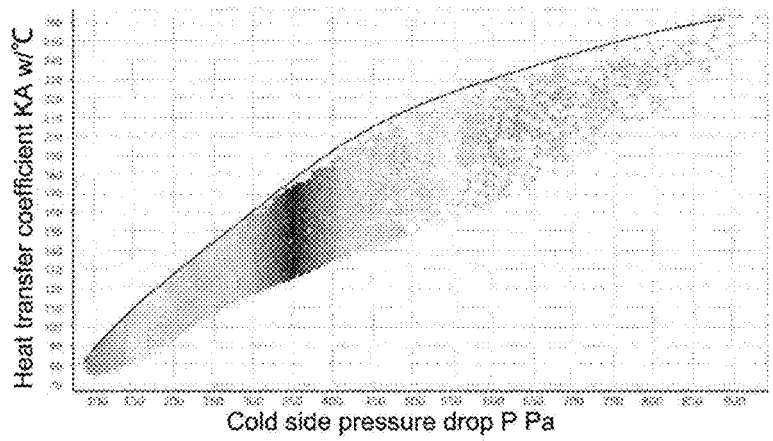
FIG. 11B is a corresponding performance map of wave amplitude as a function of wavelength at a wind speed of 6.5 m/s in an embodiment of the present disclosure.

Specifically, performance maps under various parameters can be plotted as shown in FIG. 11A and FIG. 11B with the heat transfer coefficients HA and the air side pressure drops ΔP under various parameters obtained through the fitting relationships. In FIG. 11A and FIG. 11B, various points represent performances under different parameter structures, including the heat transfer coefficient HA and the air side pressure drop ΔP. Under the same abscissa, there are different heat transfer coefficients HA corresponding to different parameter structures.

Step 320: an upper boundary line can be provided in the performance map, wherein the upper boundary line is configured to represent optimal heat transfer coefficients corresponding to different air side pressure drops respectively.

Specifically, in FIG. 11A and FIG. 11B, a larger heat transfer coefficient HA indicates a better heat exchange performance, that is, the upper boundary lines in FIG. 11A and FIG. 11B are optimal heat transfer coefficients HA corresponding to different air side pressure drops ΔP.

Step 330: the performance map can be expanded according to the distance of the upper boundary line so as to form a performance cloud chart corresponding to the respective fitted structural parameter sets.

Figure 12A:
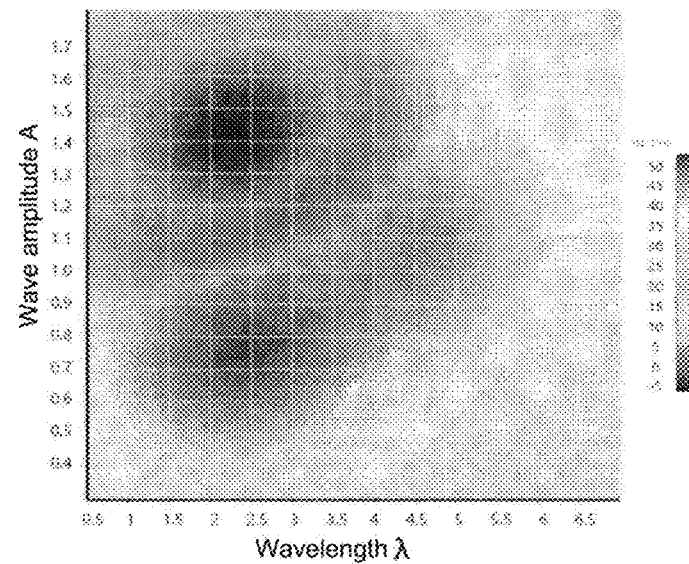
FIG. 12A is a corresponding performance cloud chart of wave amplitude as a function of wavelength at the wind speed of 4 m/s in an embodiment of the present disclosure.
Figure 12B:
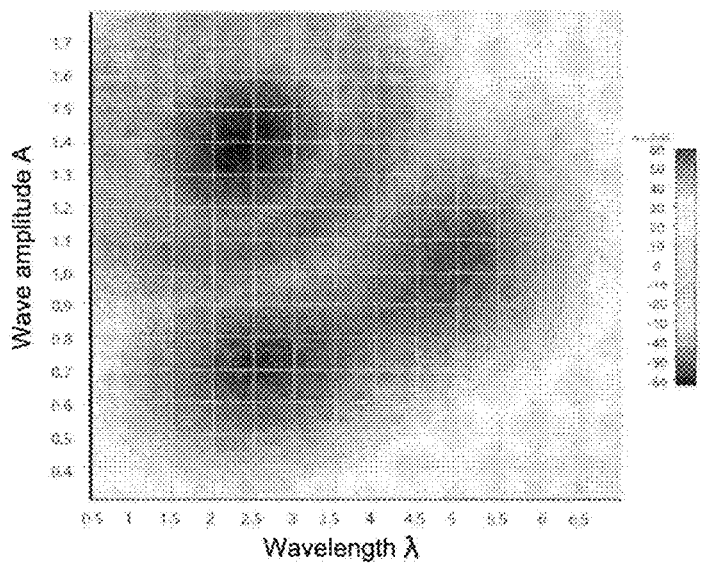
FIG. 12B is a corresponding performance cloud chart of wave amplitude as a function of wavelength at the wind speed of 6.5 m/s in an embodiment of the present disclosure.

Specifically, the performance cloud charts corresponding to various parameters can be obtained by expanding the charts according to the same distance of the upper boundary line, as shown in FIG. 12A and FIG. 12B. Shadows in FIGS. 12A and 12B represent performance capability, and a darker color in the drawings indicates a better performance. FIG. 12A and FIG. 12B are drawn according to contours to obtain FIG. 13A and FIG. 13B, and obvious optimization intervals can be specifically seen.

Step 340: the performance cloud chart can be converted into corresponding contour map according to contours.

In order to further improve the accuracy and effectiveness of the parameter optimization space of the heat dissipation fin, so as to further improve the heat dissipation performance and the anti-blocking performance of the heat dissipation fin, in one embodiment of the heat dissipation fin construction method of the present disclosure, the optimization intervals of the wave amplitude as a function of wavelength obtained at the wind speed of 4 m/s and the wind speed of 6.5 m/s are combined, with reference to FIG. 22, and step 400 of the heat dissipation fin construction method may include the following contents:

step 410: the optimization intervals of the wave amplitude and the wavelength of the heat dissipation fin can be determined according to the contour map; step 420: a corresponding combined optimization interval can be formed after the two optimization intervals at different wind speeds are combined.

It can be understood that, in FIG. 14A, a dot dash line represents the optimization interval at the wind speed of 4 m/s, a dotted line represents the optimization interval at the wind speed of 6.5 m/s, and the combined optimization interval in FIG. 14B is formed after the two are combined.

Step 430: the combined optimization interval can be divided into an upper space and a lower space.

Step 440: a first wave amplitude-wavelength relational expression can be determined according to a boundary line in the upper space, and a second wave amplitude-wavelength relational expression can be determined according to a boundary line in the lower space.

Specifically, the combined optimization interval in FIG. 14B is obtained by combining appropriate intervals in the optimization interval at the wind speed of 4 m/s and the optimization interval at the wind speed of 6.5 m/s in FIG. 14A. The combined optimization interval in FIG. 14B is divided into upper and lower boundary lines to express a relationship between the wave amplitude A and the wavelength λ to obtain FIG. 15. FIG. 15 shows parameterized expression of the optimization interval of the heat dissipation fin.

In the above, the first wave amplitude-wavelength relational expression may be as follows:

$A < -0.0138\lambda^4 + 0.1911\lambda^3 - 0.9145\lambda^2 + 1.8944\lambda - 0.5195;$ the second wave amplitude-wavelength relational expression can be as follows:

$A > 0.0064\lambda^4 - 0.1003\lambda^3 + 0.589\lambda^2 - 1.4138\lambda + 1.6181.$ Step 450: target numerical value ranges of the wave amplitude and the wavelength of the heat dissipation fin can be obtained by solving the first wave amplitude-wavelength relational expression and the second wave amplitude-wavelength relational expression.

Step 460: a target numerical value range of the twill angle can be obtained according to the optimization interval determined from the performance contour map of the twill angle as a function of the wavelength: $20° < \alpha < 40°$.

Specifically, FIG. 16A and FIG. 16B are performance contour maps of the twill angle as a function of the wavelength, then the determined optimization interval is as shown in FIG. 17, and according to the optimization interval chart, requirement of the twill angle can be obtained: $20° < \alpha < 40°$.

Further, a second optimization interval is as shown in FIG. 18:

$25° \leq \alpha \leq 35°;$ $A < -0.0203\lambda^4 + 0.2875\lambda^3 - 1.4377\lambda^2 + 3.1033\lambda - 1.5412;$
and $A > 0.0113\lambda^4 - 0.1746\lambda^3 + 0.9953\lambda^2 - 2.3484\lambda + 2.4373.$ Step 470: the heat dissipation fin can be constructed by applying the target numerical value range of the wave amplitude, the target numerical value range of the wavelength, and the pre-acquired target numerical value range of the twill angle of the heat dissipation fin.

The present study is targeted to a fin height of 7.8 mm, and it is found after further analysis that other heights also comply with this rule.

The structure of the oblique wavy fin can be optimized, some optimization implementation cases are as follows, and these cases also comply with the above structural parameter optimization ranges:

In a structure optimization, as shown in FIG. 19, the central line of one corrugated sheet 100 of two adjacent corrugated sheets 100 and the central line of the other corrugated sheet 100 can be non-coplanar straight lines, and acute angles formed between the central line of each of the two adjacent corrugated sheets 100 and the second direction both can be α.

In another structure optimization, as shown in FIG. 20, each corrugated sheet 100 further may have a second corrugated portion 120, and the first corrugated portion 110 and the second corrugated portion 120 can be mirror-symmetrical with a plane perpendicular to the second direction as a plane of symmetry.

In a further structure optimization, as shown in FIG. 21A and FIG. 21B, the corrugated sheet 100 further may be formed with a flat portion 130, the two corrugated portions are connected to two ends of the flat portion 130 in one-to-one correspondence in a fifth direction, the flat portion 130 can be perpendicular to the first direction, and the fifth direction can be perpendicular to the first direction and the second direction.

Figure 23:
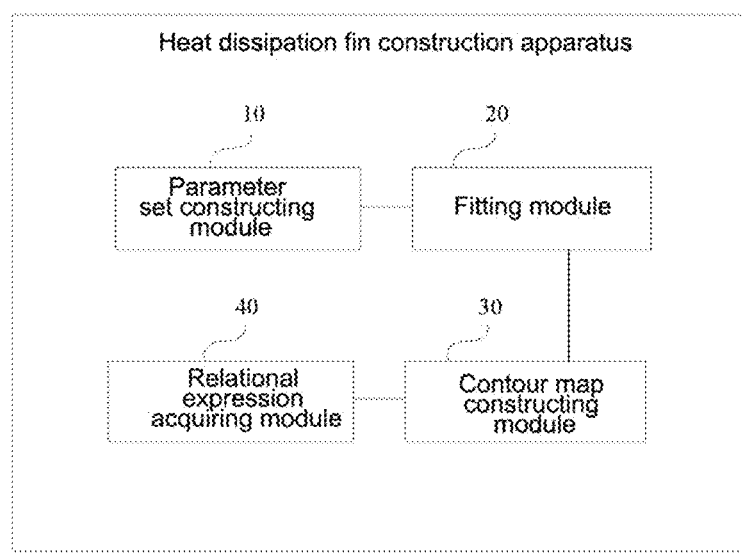
FIG. 23 is a structural schematic diagram of a heat dissipation fin construction apparatus in an embodiment of the present disclosure.

In terms of software, in order to be capable of effectively improving the anti-blocking performance of the heat dissipation fin while greatly improving the heat dissipation performance of the heat dissipation fin, the present disclosure provides an embodiment of a heat dissipation fin construction apparatus for realizing all or part of the contents in the heat dissipation fin construction method, and with reference to FIG. 23, the heat dissipation fin construction apparatus can include the following contents:

a parameter set constructing module 10, which can be configured to set a plurality of structural parameter sets according to preset numerical value ranges of a twill angle, a wave amplitude, and a wavelength of a heat dissipation fin;

a fitting module 20, which can be configured to acquire respective heat transfer coefficients and air side pressure drops corresponding to the respective structural parameter sets respectively, and establish fitting relationships of the heat transfer coefficients and the air side pressure drops versus the structural parameters, so as to obtain performance data of a plurality of fitted structural parameter sets on the basis of the fitting relationships;

a contour map constructing module 30, which can be configured to generate a corresponding performance map on the basis of the performance data of the respective fitted structural parameter sets, and acquire a contour map corresponding to the performance map; and a relational expression acquiring module 40, which can be configured to determine optimization intervals of the wave amplitude and the wavelength of the heat dissipation fin according to the contour map, and determine a wave amplitude-wavelength relational expression of the heat dissipation fin according to the optimization intervals, so as to construct the heat dissipation fin on the basis of the wave amplitude-wavelength relational expression.

In an embodiment, the contour map constructing module 30 can be configured to: generate a corresponding performance map on the basis of the performance data of the respective fitted structural parameter sets, wherein various points in the performance map respectively represent the performance data of the respective fitted structural parameter sets in one-to-one correspondence, and the performance data include the heat transfer coefficient and the air side pressure drop; provide an upper boundary line in the performance map, wherein the upper boundary line is for representing optimal heat transfer coefficients corresponding to different air side pressure drops respectively; expand the performance map according to a distance of the upper boundary line so as to form a performance cloud chart corresponding to the respective fitted structural parameter sets; and convert the performance cloud chart into corresponding contour map according to the contours.

In an embodiment, the relational expression acquiring module 40 can be configured to determine optimization intervals of the wave amplitude and the wavelength of the heat dissipation fin according to the contour map; form a corresponding combined optimization interval after combining the two optimization intervals at different wind speeds, and divide the combined optimization interval into an upper space and a lower space; determine a first wave amplitude-wavelength relational expression according to a boundary line in the upper space, and determine a second wave amplitude-wavelength relational expression according to a boundary line in the lower space; obtain numerical value ranges of the wave amplitude and the wavelength of the heat dissipation fin by solving the first wave amplitude-wavelength relational expression and the second wave amplitude-wavelength relational expression; obtain a target numerical value range of the twill angle according to the optimization interval determined from the performance contour map of the twill angle as a function of the wavelength; and construct the heat dissipation fin by applying the target numerical value range of the wave amplitude, the target numerical value range of the wavelength, and the pre-acquired target numerical value range of the twill angle of the heat dissipation fin.

In an embodiment, the fitting module 20 can be configured to: set values of a height, a thickness, and a peak-to-peak distance of a heat dissipation belt of the heat dissipation fin in the heat dissipation fin physical model, and set calculation variables; calculate the heat transfer coefficients and air side pressure drops corresponding to the respective structural parameter sets based on a preset CFD mode according to the values of the height, the thickness, and the peak-to-peak distance of the heat dissipation belt of the heat dissipation fin in the heat dissipation fin physical model, and the calculation variables respectively; and fit the heat transfer coefficients and the air side pressure drops to the structural parameters respectively, wherein the structural parameters include: the wavelength, the wave amplitude, and the twill angle; and obtain fitting relationships of the heat transfer coefficients and the air side pressure drops versus various structural parameters, so as to obtain performance data of a plurality of fitted structural parameter sets on the basis of the fitting relationships.

In an embodiment, the parameter set constructing module 10 can be configured to set a plurality of structural parameter sets according to the preset numerical value ranges of the twill angle, the wave amplitude, and the wavelength of the heat dissipation fin by applying a preset DOE mode.

The heat dissipation fin construction apparatus provided in the present description may specifically be configured to execute a processing procedure of the embodiments of the above heat dissipation fin construction method, functions thereof are not repeated herein again, and reference can be made to the detailed description of the embodiments of the above heat dissipation fin construction method.

It can be seen from the above description that the heat dissipation fin construction apparatus provided in the embodiments of the present disclosure can provide more reasonable parameter optimization intervals of the heat dissipation fin, further can effectively improve the anti-blocking performance of the heat dissipation fin while greatly improving the heat dissipation performance of the heat dissipation fin, and can simultaneously achieve the best heat dissipation and anti-blocking performances.

In terms of hardware, in order to be capable of effectively improving the anti-blocking performance of the heat dissipation fin while greatly improving the heat dissipation performance of the heat dissipation fin, the present disclosure provides an embodiment of an electronic device for realizing all or part of the contents in the heat dissipation fin construction method, and the electronic device specifically includes the following contents:

a processor, a memory, a communication interface, and a bus, wherein the processor, the memory, and the communication interface complete communication with each other through the bus; the communication interface is configured to realize information transmission between the heat dissipation fin construction apparatus and related devices, such as various databases, core systems, other relevant servers, controllers, heat dissipation fin production devices and user terminals; the electronic device may be a desktop computer, a tablet computer, a mobile terminal, and the like, but the present embodiment is not limited thereto. In the present embodiment, the electronic device may be implemented with reference to the embodiments of the heat dissipation fin construction method and the embodiments of the heat dissipation fin construction apparatus in the embodiments, which contents are incorporated herein, and repetitions will not be repeated.

In an embodiment, the heat dissipation fin constructing function may be integrated into the processor. In the above, the processor may be configured to perform the following controls:

step 100: setting a plurality of structural parameter sets according to the preset numerical value ranges of the twill angle, the wave amplitude, and the wavelength of the heat dissipation fin;

step 200: acquiring respective heat transfer coefficients and air side pressure drops corresponding to the structural parameter sets respectively, and establishing the fitting relationships of the heat transfer coefficients and the air side pressure drops versus the structural parameters, so as to obtain the performance data of a plurality of fitted structural parameter sets on the basis of the fitting relationships;

step 300: generating the corresponding performance map on the basis of the performance data of the respective fitted structural parameter sets, and acquiring the contour map corresponding to the performance map; and step 400: determining the optimization intervals of the wave amplitude and the wavelength of the heat dissipation fin according to the contour map, and determining the wave amplitude-wavelength relational expression of the heat dissipation fin according to the optimization intervals, so as to construct the heat dissipation fin on the basis of the wave amplitude-wavelength relational expression.

It can be seen from the above description that the electronic device provided in the embodiment of the present disclosure can provide more reasonable parameter optimization intervals of the heat dissipation fin, further can effectively improve the anti-blocking performance of the heat dissipation fin while greatly improving the heat dissipation performance of the heat dissipation fin, and can simultaneously achieve the best heat dissipation and anti-blocking performances.

An embodiment of the present disclosure further provides a computer-readable storage medium that can realize all steps of the heat dissipation fin construction method in the above embodiments, the computer-readable storage medium stores a computer program, when the computer program is executed by a processor, all steps of the heat dissipation fin construction method in the above embodiments with an execution subject being a server or a client are realized, for example, when the processor executes the computer program, the following steps are realized:

step 100: setting a plurality of structural parameter sets according to the preset numerical value ranges of the twill angle, the wave amplitude, and the wavelength of the heat dissipation fin;

step 200: acquiring respective heat transfer coefficients and air side pressure drops corresponding to the structural parameter sets respectively, and establishing the fitting relationships of the heat transfer coefficients and the air side pressure drops versus the structural parameters, so as to obtain the performance data of a plurality of fitted structural parameter sets on the basis of the fitting relationships;

step 300: generating the corresponding performance map on the basis of the performance data of the respective fitted structural parameter sets, and acquiring the contour map corresponding to the performance map; and step 400: determining the optimization intervals of the wave amplitude and the wavelength of the heat dissipation fin according to the contour map, and determining the wave amplitude-wavelength relational expression of the heat dissipation fin according to the optimization intervals, so as to construct the heat dissipation fin on the basis of the wave amplitude-wavelength relational expression.

It can be seen from the above description that the computer-readable storage medium provided in the embodiment of the present disclosure can provide more reasonable parameter optimization intervals of the heat dissipation fin, further can effectively improve the anti-blocking performance of the heat dissipation fin while greatly improving the heat dissipation performance of the heat dissipation fin, and can simultaneously achieve the best heat dissipation and anti-blocking performances.

Based on the heat dissipation fin construction method, the heat dissipation fin construction apparatus, the electronic device or the computer-readable storage medium mentioned in the above embodiments, more reasonable parameter optimization intervals of the heat dissipation fin can be obtained, and then the target numerical value ranges of the wave amplitude and the wavelength of the heat dissipation fin are obtained by solving according to the parameter optimization intervals; the target numerical value range of the wave amplitude and the target numerical value range of the wavelength of the heat dissipation fin can be sent to an automatic heat dissipation fin production device, so that the heat dissipation fin production device produces the heat dissipation fin that meets the target numerical value range of the wave amplitude and the target numerical value range of the wavelength.

On this basis, in order to be capable of effectively improving the anti-blocking performance of the heat dissipation fin while greatly improving the heat dissipation performance of the heat dissipation fin, the present disclosure further provides a heat dissipation fin constructed and obtained by applying the heat dissipation fin construction method, the heat dissipation fin construction apparatus, the electronic device or the computer-readable storage medium in the above, and a specific structure of the heat dissipation fin may be as follows:

at least two corrugated sheets 100 arranged in a first direction, wherein two adjacent corrugated sheets 100 are arranged opposite to each other, the corrugated sheets 100 have a length that can extend in a second direction, a first corrugated portion 110 with a central line extending in a third direction can be formed on each corrugated sheet 100, a cross section of the first corrugated portion 110 can have a peak 111 and a trough 112; and the first direction is perpendicular to the second direction;

the heat dissipation fin can satisfy the following relational expressions:

$$20°≤α≤40°;$$

$$A<-0.0138λ^4+0.1911λ^3-0.9145λ^2+1.8944λ-0.5195;$$
and $$A>0.0064λ^4-0.1003λ^3+0.589λ^2-1.4138λ+1.6181,$$

where α is an angle between the central line and the second direction;

A is the wave amplitude, i.e., a distance between the peak and the trough in the first direction; and λ is the wavelength, i.e., a distance between two adjacent peaks in a fourth direction, wherein the fourth direction is perpendicular to the first direction and the third direction.

By designing the key parameters, i.e., the angle α between the central line and the second direction, the wave amplitude A, and the wavelength λ, the heat dissipation fin provided in the present disclosure is improved on the heat dissipation capability to a certain extent on the premise of satisfying the anti-blocking performance, and further satisfies the current requirements to performances of the heat dissipation fin.

That is to say, the structure of the heat dissipation fin: many continuous Ω shapes are formed by bending the flat material, including upper and lower surfaces and middle ribs, the middle ribs are formed thereon with a wavy structure with a concave-convex arrangement, the central line of the waves forms the included angle α with the upper and lower surfaces, and when cold air passes through the oblique waves of the ribs, effects in two aspects are produced: 1. there is obvious secondary-flow-enhanced heat exchange; and 2. guiding the cold air towards the root portion of the fin with higher heat exchange efficiency also can enhance the heat exchange.

Herein, the parameter ranges are as follows: the twill angle can be 20°≤α≤40° and the wave amplitude and the wavelength should satisfy the following relationships: $A<-0.0138λ^4+0.1911λ^3-0.9145λ^2+1.8944λ-0.5195;$ $A>0.0064λ^4-0.1003λ^3+0.589λ^2-1.4138λ+1.6181,$ and this region is the optimization parameter interval.

In addition, when the heat dissipation fin provided in the embodiments of the present disclosure is in use, the first corrugated portion 110 will guide the cold air towards the root portion of the fin, that is, guide the cold air towards a first bottom sheet and a second bottom sheet, as the root portion of the fin is primary heat exchange surface with relatively high heat exchange efficiency, the heat dissipation performance also can be obviously improved. Moreover, the heat dissipation fin is still a continuous fin, and the anti-blocking performance thereof is equivalent to that of the conventional wavy fin.

Optionally, the heat dissipation fin provided in the embodiments of the present disclosure may include a first bottom sheet 300 and a second bottom sheet 200, in the fifth direction, one end of the corrugated sheet 100 is connected to the first bottom sheet 300, and the other end of the corrugated sheet 100 is connected to the second bottom sheet 200, the first corrugated portion 110 extends to the first bottom sheet 300 and the second bottom sheet 200, and the fifth direction is perpendicular to the first direction and the second direction. When the cold air passes through the oblique waves, on the basis of extending along an original flowing direction, a part of the air will develop towards a direction in which the oblique waves are inclined, to form vortices. A multi-directional flowing state will enhance heat exchange strength on of the fin surface, and meanwhile, it is easier to carry away impurities, accumulated dust and the like. The heat dissipation and anti-blocking performances are improved, on the other hand, the cold air can be directly guided by the first corrugated portion 110 towards the root portion, i.e., the air flow is directly guided towards the first bottom sheet 300 and the second bottom sheet 200, thus achieving direct, rapid, and sufficient heat exchange, and further improving the heat dissipation performance of the heat dissipation fin.

Optionally, the first bottom sheet 300 and the second bottom sheet 200 have the same dimension in the first direction. This makes gaps between adjacent corrugated sheets 100 have substantially the same size, so that the cold air can be more uniformly distributed among various corrugated sheets 100, and further the heat dissipation fin can obtain relatively ideal heat dissipation effect in all parts.

Optionally, at least two first corrugated portions 110 are provided, and all the first corrugated portions 110 are arranged in the second direction. The plurality of first corrugated portions 110 can make more sufficient effect of guiding the cold air, so that the heat dissipation fin obtains a better heat dissipation effect.

Optionally, positions of the first corrugated portions 110 on two adjacent corrugated sheets 100 in the first direction are corresponding to each other. This makes the arrangement of the first corrugated portions 110 on the corrugated sheets 100 more regular and facilitates press forming.

In another aspect, the present disclosure provides a heat exchanger, including the heat dissipation fin provided in the above embodiments of the present disclosure.

The heat exchanger provided in the present disclosure uses the heat dissipation fin provided in the present disclosure, and by designing the key parameters, i.e., the angle α between the central line and the second direction, the wave amplitude A, and the wavelength λ, the heat dissipation fin is improved on the heat dissipation capability to a certain extent on the premise of satisfying the anti-blocking performance, and further satisfies the current requirements to performances of the heat dissipation fin.

Based on the above contents, verification on performance improvement of the heat dissipation fin is performed. Five samples are manufactured, and the heat dissipation belts used are respectively the conventional wavy fin, three oblique wavy fins with parameters on the contour of the optimization interval, and the oblique wavy fin with parameters outside the optimization interval. A comparative experiment is carried out in a wind tunnel test bench, and result shows that: 1) the oblique wavy fin has obvious performance improvement compared with the conventional fin, 2) the oblique wavy fin with the structural parameters within the optimization interval has better performances, and 3) the three oblique wavy fin samples with structural parameters on the contour of the optimization interval have the same performances (a slight difference is caused by test errors). See Table 3 for comparison of the samples:

TABLE 3

| Sample | Sample 1 | Sample 2 | Sample 3 | Sample 4 | Sample 5 |
|---|---|---|---|---|---|
| Fin type | Conventional wavy fin | Oblique wavy fins--parameters on contour | | | Oblique wavy fin--parameters outside optimization interval |
| Heat dissipation belt height H × peak-to-peak distance Fp | 7.8 × 5.35 | 7.8 × 5.35 | 7.8 × 5.35 | 7.8 × 5.35 | 7.8 × 5.35 |
| Wave amplitude A × wavelength $\lambda$ | 1.1 × 10.8 | 0.54 × 3.0 | 1.15 × 4.0 | 0.8 × 5.0 | 1.2 × 3 |
| Twill angle ° $\alpha$ | None | 30° | 30° | 30° | 50° |
| Heat dissipation amount kW under air resistance of 200 Pa | 79.1 | 88.7 | 87.8 | 88.1 | 83.4 |
| Performance | 100% | 112.1% | 111.1% | 111.5% | 105.4% |

FIG. 3A to FIG. 3D are structural schematic diagrams of the conventional wavy fin. In order to more conveniently compare the conventional wavy fin with the heat dissipation fin provided in the embodiments of the present disclosure, various main parameters of the conventional wavy fin shown in FIG. 3A to FIG. 3D are selected as follows: H represents the height of the conventional wavy fin, W represents the width of the conventional wavy fin, and a represents the twill angle of the conventional wavy fin; L represents the length of the conventional wavy fin, Fp represents the peak-to-peak distance of the conventional wavy fin, T represents the material thickness of the conventional wavy fin, $\lambda$ represents the wavelength of the conventional wavy fin, and A represents the wave amplitude of the conventional wavy fin.

Although the patent document with publication number CN106716041B makes corresponding research on a novel heat dissipation fin, sufficient researches are still needed, and there are still the following problems:

1) in the above patent document, the optimization parameter is a heat dissipation ratio Q>100%, and an optimal solution of the parameter still needs to be researched;
2) a clear performance optimization gradient still needs to be proposed;
3) the analysis in the above patent document does not study performance under different cold air;
4) the analysis in the above patent document does not study the influence of the twill angle on the performance; and
5) a scientific research method is not proposed in the above patent document By means of the technical solution provided in the embodiments of the present disclosure, the above technical problems existing in the above patent document can be solved.

In the present disclosure, the method disclosed may be implemented as operations executed by a device. In addition, it should be understood that a specific order or hierarchical structure of steps in the method disclosed in the present disclosure is an example of a sample method. In other embodiments, the specific order or hierarchical structure of steps in the method may be rearranged while remaining within the subject matter disclosed in the present disclosure. The method claims attached present elements of various steps in a sample order, and it does not necessarily mean to be limited to the particular order or hierarchical structure presented. It is believed that the present disclosure and many of the attached advantages thereof will be understood through the forgoing description, and it will be apparent that various modifications can be made in the form, construction, and arrangement of the components without departing from the subject matter disclosed in the present disclosure or without sacrificing all of its material advantages. The forms described are merely illustrative, and the following claims are intended to cover and include such modifications.

The expressions (such as "first" or "second") used in various embodiments of the present disclosure may modify various constituent elements in various embodiments, although corresponding constituent elements may not be limited. For example, the above expressions do not limit the order and/or importance of the elements. The above expressions are merely for the purpose of distinguishing one element from other elements. For example, a first user device and a second user device indicate different user devices, although both are user devices. For example, without departing from the scope of various embodiments of the present disclosure, a first element may be referred to as a second element, and likewise, the second element may also be referred to as first element.

It should be noted that if it is described that one constituent element is "connected" to another constituent element, the first constituent element may be directly connected to the second constituent element, and a third constituent element may be "connected" between the first constituent element and the second constituent element. Conversely, when a constituent element is "directly connected" to another constituent element, it can be understood that there is no third constituent element between the first constituent element and the second constituent element.

Terms used in various embodiments of the present disclosure are merely for the purpose of describing specific embodiments, rather than limiting various embodiments of the present disclosure. As used herein, a singular form is also intended to include a plural form, unless clearly otherwise indicated in the context. Unless otherwise defined, all terms (including technical terms and scientific terms) used herein have the same meaning as that generally understood by a person ordinarily skilled in the art of various embodiments of the present disclosure. The terms (such as terms defined in dictionaries commonly used) shall be construed as having the same meaning as that in the context of relevant technical field and shall not be construed as having an ideal meaning or overformal meaning, unless clearly defined in various embodiments of the present disclosure.

INDUSTRIAL APPLICABILITY

The present disclosure provides a heat dissipation fin construction method, a heat dissipation fin construction apparatus, and a heat dissipation fin, which solves the problem of how to find more reasonable optimization intervals to construct the heat dissipation fin with better performances, can provide more reasonable parameter optimization intervals of the heat dissipation fin, further can effectively improve the anti-blocking performance of the heat dissipation fin while greatly improving the heat dissipation performance of the heat dissipation fin, and can simultaneously achieve the best heat dissipation and anti-blocking performances.

Besides, it can be understood that the heat dissipation fin construction method, the heat dissipation fin construction apparatus, and the heat dissipation fin in the present disclosure are reproducible, and can be used in various industrial applications. For example, the heat dissipation fin construction method, the heat dissipation fin construction apparatus, and the heat dissipation fin in the present disclosure can be used for any part that needs a fin for heat dissipation.

What is claimed is:

1. A heat dissipation fin, comprising at least two corrugated sheets arranged in a first direction, wherein two adjacent corrugated sheets are arranged opposite to each other, each of the at least two corrugated sheets has a length extending in a second direction, a first corrugated portion with a central line extending in a third direction is formed on each of the at least two corrugated sheets, a cross section of the first corrugated portion has a peak and a trough; and the first direction is perpendicular to the second direction, wherein the heat dissipation fin satisfies the following relational expressions:

$$20° \leq \alpha \leq 40°;$$

$$A < -0.0138\lambda^4 + 0.1911\lambda^3 - 0.9145\lambda^2 + 1.8944\lambda - 0.5195;$$
and $$A > 0.0064\lambda^4 - 0.1003\lambda^3 + 0.589\lambda^2 - 1.4138\lambda + 1.6181,$$
where $\alpha$ is an angle between the central line and the second direction;

A is a wave amplitude, i.e., a distance between the peak and the trough in the first direction; and $\lambda$ is a wavelength, i.e., a distance between two adjacent peaks in a fourth direction, wherein the fourth direction is perpendicular to the first direction and the third direction.

2. The heat dissipation fin according to claim 1, wherein the heat dissipation fin is constructed by applying a heat dissipation fin construction method, and wherein the heat dissipation fin construction method comprises steps of:

setting a plurality of structural parameter sets according to preset numerical value ranges of a twill angle, the wave amplitude, and the wavelength of the heat dissipation fin;

acquiring respective heat transfer coefficients and air side pressure drops corresponding to the structural parameter sets respectively, and establishing fitting relationships of the heat transfer coefficients and the air side pressure drops versus the structural parameters, so as to obtain performance data of a plurality of fitted structural parameter sets on the basis of the fitting relationships;

generating a corresponding performance map on the basis of the performance data of the respective fitted structural parameter sets, and acquiring a contour map corresponding to the performance map; and determining optimization intervals of the wave amplitude and the wavelength of the heat dissipation fin according to the contour map, and determining a wave amplitude-wavelength relational expression of the heat dissipation fin according to the optimization intervals, so as to construct the heat dissipation fin on the basis of the wave amplitude-wavelength relational expression.

3. The heat dissipation fin according to claim 1, wherein the heat dissipation fin satisfies the following relational expressions:

$$25° \leq \alpha \leq 35°;$$

$$A < -0.0203\lambda^4 + 0.2875\lambda^3 - 1.4377\lambda^2 + 3.1033\lambda - 1.5412;$$
and $$A > 0.0113\lambda^4 - 0.1746\lambda^3 + 0.9953\lambda^2 - 2.3484\lambda + 2.4373.$$

4. The heat dissipation fin according to claim 1, wherein the central line of one corrugated sheet of the two adjacent corrugated sheets and the central line of the other corrugated sheet of the two adjacent corrugated sheets are non-coplanar straight lines, and acute angles formed between the central line of each of the two adjacent corrugated sheets and the second direction are both $\alpha$.

5. The heat dissipation fin according to claim 1, wherein the corrugated sheet of the at least two corrugated sheets is further provided with a second corrugated portion, and the first corrugated portion and the second corrugated portion are mirror-symmetrical with a plane perpendicular to the second direction as a plane of symmetry.

6. The heat dissipation fin according to claim 1, wherein the corrugated sheet of the at least two corrugated sheets is further formed with a flat portion, the two corrugated portions are connected to two ends of the flat portion in one-to-one correspondence in a fifth direction, the flat portion is perpendicular to the first direction, and the fifth direction is perpendicular to the first direction and the second direction.

* * * * *